United States Patent [19]

Carranza-Almaguer

[11] Patent Number: 5,213,611
[45] Date of Patent: May 25, 1993

[54] METHOD OF CONTROLLING METALLIZATION OF DIRECTLY REDUCED ORES

[75] Inventor: Federico E. Carranza-Almaguer, Monterrey, Mexico

[73] Assignee: Hylsa S.A. de C.V., Nuevo Leon, Mexico

[21] Appl. No.: 573,351

[22] Filed: Aug. 27, 1990

[51] Int. Cl.$^5$ .............................................. C21B 13/08
[52] U.S. Cl. ........................................ 75/376; 75/444
[58] Field of Search ................................. 75/376, 444

[56] References Cited

U.S. PATENT DOCUMENTS 3,053,648  9/1962  Stephens .............................. 75/444
3,131,052  4/1964  Peras .................................... 75/450

Primary Examiner—Peter D. Rosenberg
Attorney, Agent, or Firm—A. Thomas S. Safford

[57] ABSTRACT

Process control method for regulating the percentage reduction of sponge metal produced in a moving bed vertical reduction reactor by means of sampling at a single level in the reactor (preferably centrally located) for determining the concentration ratio of a reducing gas species and its oxidized product (such as the CO/CO$_2$ ratio in a sponge iron reactor) and comparing such ratio with an established discovered interrelationship between such concentration ratios and the final degree of metallization, and regulating the process control parameters so as to shift the concentration ratio at the sampling point towards a ratio previously established to yield the desired final degree of metallization for the sponge metal (thus permitting reliable compensating adjustment of the reduction process relative to the sampled ore prior to completing its reduction so that the final metallization achieved for the ore adjacent such sample will have the degree of metallization desired, thus avoiding the serious lag time and imprecision in adjustments of the metalization typical of prior art practices).

14 Claims, 4 Drawing Sheets

FIG. I

METHOD OF CONTROLLING METALLIZATION OF DIRECTLY REDUCED ORES

FIELD OF THE INVENTION

This invention relates to the gaseous reduction of oxidic ores in moving bed vertical reduction reactors to directly reduce the ores into sponge metal, and more particularly to a method for measuring and controlling at a desired value the percentage of reduction of the sponge metal produced in such reactors (including sponge iron).

BACKGROUND OF THE INVENTION

Typical reduction systems in which the present invention may be usefully employed are disclosed in U.S. Pat. Nos. 3,765,872; 3,748,120; 4,528,030; and 4,834,792. Several methods have been used in the past for measuring and controlling the reduction rate in such systems as those disclosed in U.S. Pat. Nos. 3,601,381; 4,121,922; 4,153,450 and Japanese Patent Application No. 54-22226 dated Feb. 26, 1979. The content of these patents, particularly 4,153,450 are incorporated herein by reference.

U.S. Pat. No. 3,601,381 suggests a pair of gas sampling probes, are positioned in the ($H_2$ & CO)-containing reducing gas inlet to a sponge iron reduction reactor and the other positioned laterally within the reactor at or slightly below said inlet, which probes connect to respective gas analyzers for comparing $CO_2$ content at both probe positions. Assertedly, if the $CO_2$ content is essentially equally low, then the sponge iron which is positioned ready for discharge at that point is sufficiently reduced; while a higher $CO_2$ interior reading (relative to the external inlet reading) would indicate insufficient reduction and require interruption of the sponge iron discharge while reduction continues on the slowed or immobilized burden.

Although the invention of U.S. Pat. No. 3,601,381 relates to a commercialized process, to applicant's knowledge it has never itself been commercially used. This is not surprising since the interior gas sampling probe is not practical either as a permanent installation (being in too hostile an environment) nor as an intermittent probe (being too obstructed) and because of the unstable conditions present at the indicated interior point of sampling.

In U.S. Pat. No. 4,121,922 a batchwise gaseous reduction of metal oxide ores in a multi-stage gaseous reduction system is shown in which separate bodies of metal bearing material are simultaneously treated in a plurality of reactors to produce sponge metal, wherein the flow and composition of the reactor feed gas is determined before it is heated and fed to the reactor, the flow and composition of the reactor effluent gas is determined after it has been cooled and de-watered and the measured values of these flows and compositions are correlated to determine the rate of oxygen removal from the bed of metal bearing material in the reactor. The rate of oxygen removal then can be integrated to provide a signal continuously indicative of the percentage reduction of the reactor. Thus, as shown in the preferred example, it is possible by using a hydrogen balance and an oxygen balance to obtain an acceptable determination of the oxygen removal from the iron ore in the reduction reactor without making any measurement of the change in the amount of water vapor in the gas. Since this method is based on material balances, the substraction of big molar flows with little difference in magnitude between them considerably amplifies the measurement errors.

As can be seen from the foregoing, this method lacks simplicity and because of its mathematical integrations and sampling procedures and the special material balance involved its application is difficult.

In U.S. Pat. No. 4,153,450 molar flow rates and compositions are measured in spent and reducing gases leaving from and being fed to a moving bed vertical reduction reactor and are correlated with the reducible oxygen content of the ore and with the sponge iron production rate to determine an estimated percentage of reduction.

During passage of the reducing gas through the reduction reactor the gas composition changes as an incident of the removal of oxygen from the iron ore and hence it is theoretically possible to determine indirectly the percentage of reduction by measuring changes in the composition of the gas flowing through the reactor. However, numerous practical problems are encountered when an effort is made to measure the percentage of reduction. In the first place there is an elapsed time of several hours between the instant when the constituents of the spent gases are measured and compared with the reduction gases being fed to the reduction reactor, and the instant when the burden being reduced is discharged from the reactor and its real reduction rate is actually measured. Furthermore, as said measurements involve a special and very precise material balance between said compositions at the inlet and at the outlet of the reactor, such process is difficult and impractical. Thus, even though changes can be made to modify the reduction rate, there is an uncertainty on the effect that such changes will produce and the effect can only actually be measured some time later.

A further problem with this method arises with respect to choosing the point of measurement. Any point outside a reactor has the disadvantages discussed above. Thus, the preferable point of measurement would seem to be internal to the reactor. However, the latter also has inherent problems which arise from the fact that the reduction reactor is a pressure vessel with a hostile high temperature environment having closely packed particles with gas flows whose composition can be very uneven, being particularly biased at the points of injection and removal (caused by uneven flow patterns and a chemical instability resulting from fluctuations in the pressure of the gases due to the moving burden). Even direct analysis of samples of partially-reduced ore particle specimens from within the reactor is known not to be reliable, because the degree of metallization of any such sample can vary significantly from the average overall degree of metallization of the burden as a whole because of the unevenness of particle size, of gas and solid flows, of porosity, and the like. See for example the comments in the Japanese reference discussed next.

Japanese Patent Application No. 54-22226 shows an example in a fixed bed or batchwise iron oxide reduction process, wherein the degree of metallization is derived from a previously-determined relationship between reduction speed and degree of metallization for specific operating conditions and a given raw material. The Japanese applicant noted that as the reduction reaction progresses the reduction speed decreases as the degree of metallization increases, and such decrease results in a decrease in the difference in the amount of oxygen contained in the gas between the inlet and the outlet of the furnace. However, such change in the amount of oxygen in the composition of the gas may be unreliable, because the oxygen measured is involved in several successively occurring reactions.

It was also stated that when the flow rate and composition of the gas are maintained substantially constant at the inlet of the furnace, then their values need be measured only once and such values may be used in succeeding calculations and thereafter the gas analysis need be performed only at the outlet of the furnace. It was suggested that this method can be applied to a moving bed reduction reactor by establishing different locations for measurement both inside and outside the reactor, but apart from general considerations such as reducing time and speed of the moving material, this reference does not teach any specific or practical way in which this can actually be accomplished.

When the reduction speed is decreased, the metallization increases, so that the differences between two measuring points are also decreased to a very small value. Thus, the Japanese applicant recommend adopting various procedures in combination in an effort to make their method useful. From the foregoing, it is apparent that this method is difficult to implement due to the fact that a change in metallization requires the implementation of numerous changes in the operating variables which are not desirable in a moving bed reduction process because of the operational problems that result which are worse than the problems solved. It is also noted that this method is time dependant. Thus it is necessary to compensate for the elapsed time between the measurements at the measuring points and furthermore to take into consideration the analyzing time.

In addition to the foregoing problems, often the operating parameters may have to be changed to accommodate the type of ore or to modify the characteristics of the desired final product of the direct reduction. This is true, for example, when a lesser degree of reduction is not only permissible but desired; such as when a further processing step does not require or even is adversely affected by a higher degree of reduction. Modern pre-reduction and smelting and refining processes of iron ores for steelmaking are negatively affected by too high a degree of pre-reduction. Thus, from the foregoing it will be apparent that the prior art methods of process control are complicated and still lack the precision and speed necessary to give dependable and usefully timely values for the reduction rate and/or for the degree of metallization.

OBJECTS OF THE INVENTION

Accordingly it is an object of the present invention to provide a method for measuring the percentage of reduction of an oxidic ore in a vertical moving bed direct reduction reactor, and also additionally for maintaining said measured percentage at a desired operating value.

It is a further object of the present invention to provide a method for achieving a greater flexibility of operation by more rapid and accurate measurement of the percentage of reduction of an oxidic ore in a vertical moving bed direct reduction reactor so as to give for the first time sufficiently timely and reliable feedback data to allow a rapid and accurate adjustment in the process controls over the degree of reduction so that the burden of oxidic ore measured is the same burden affected by the adjustments made in response to such measurements, particularly as this applies to the production of sponge iron.

Other objects of the invention will be in part obvious and in part pointed out hereafter.

BRIEF DESCRIPTION OF THE INVENTION

As mentioned above, it has not proven to be very practical to measure the composition of the spent gases leaving the reduction reactor and the upgraded gases being fed to the reactor because of the delay in confirming that an effective change in the degree of reduction or metallization of the oxidic ores has occurred. Such delay is due to the elapsed time between the instant in which the gaseous measurement is made and the instant in which an actual confirmatory direct measurement can be made on the reduced burden once it is discharged from the reduction reactor. The latter actual measurement is needed both because of the uncertainty on the effect in the burden due to a change in the operational variables based merely on the gross external gaseous measurements (and the calculations based thereon) and by the inherent chemical variations within the reactor.

Applicant has discovered that the $CO/CO_2$ concentration ratios in the reduction reactor (preferably measured at a given mid-point therein) reliably correlate directly to the degree of reduction of the final product. Thus, the objects and advantages of the present invention are achieved in general (1) by measurements made inside of the reduction reactor on the composition of the reducing gas with respect to three main process variables, namely incoming reduction gas temperature, incoming reduction gas flow, and percentage of $CO_2$ in the reduction gas, and then (2) by evaluating the $CO/CO_2$ ratio to correlate its variation with the degree of reduction achieved. The correlated $CO/CO_2$ ratio thus determined can be used as a control variable to regulate manually or automatically the three main process variables to maintain the percentage of reduction at a desired value.

In accordance with a preferred embodiment of the present invention, many of the above mentioned problems can be circumvented by measuring the composition of reducing gas stream within the reactor preferably at or near a mid-point of the moving bed of particles being reduced between the reduction gas inlet and the reduction gas outlet to obtain a $CO/CO_2$ ratio for the internal reducing gas stream which is chemically stable (i.e., consistently reproducible), and which has a sufficiently large value to give adequate precision to the desired percentage of reduction (so as to permit meaningful adjustment of the main operational variables to obtain that steady ratio value which correlates to the percentage of reduction desired for the directly reduced product). This finds particular advantage in the production of sponge iron.

DESCRIPTION OF THE DRAWINGS

In this specification and in the accompanying drawings, I have shown and described preferred embodiments of my invention and have suggested various alternatives and modifications thereof; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION OF PREFERRED EMBODIMENTS

Figure 1:
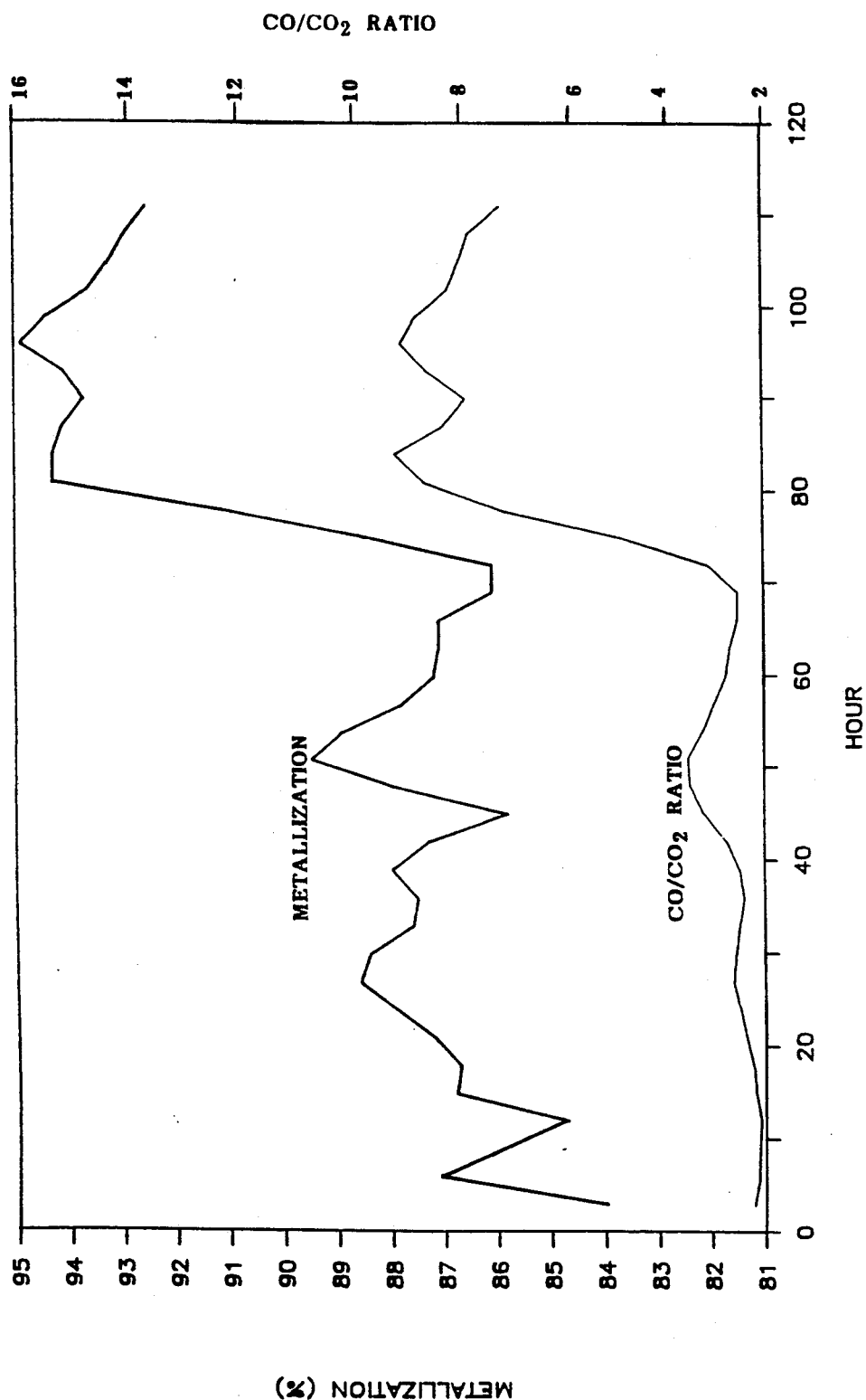
FIG. 1 is a graph showing the correlation of the measured $CO/CO_2$ ratio and of the actual percentage of final metallization versus time.

The details of the invention will be exemplified in relation to controlling a process for producing directly reduced iron (DRI, also called sponge iron).

The solid phase concentration or metallization of DRI can be known for a determined point in the reduction zone of a reactor by means of the equations involved in the last step of the reduction reaction of the iron ore expressed by:

$$H_{2(g)} + Fe_{0.947}O_{(s)} \rightleftharpoons H_2O_{(g)} + 0.947 Fe^°_{(s)} \quad (1)$$

$$CO_{(g)} + Fe_{0.947}O_{(s)} \rightleftharpoons CO_{2(g)} + 0.947 Fe^°_{(s)} \quad (2)$$

wherein the concentration of variables such as $CO$, $H_2$, $CO_2$, and $H_2O$ and the temperature in the measuring point should be known. Under a thermodynamic equilibrium, the concentration of the solid phase can be calculated using either of the equations (1) or (2). Generally, it is simpler to use equation (2) because of the problems encountered in using a chromatograph to analyze the concentration of $H_2O$ due to the phase change involved. Nevertheless, it is possible to use equation (1).

By using the equilibrium constant equation for (2):

$$K = \frac{(A_{Fe°})^n \cdot A_{CO_2}}{A_{CO} \cdot A_{Fe_nO}} \quad (3)$$

which is related with the Gibbs free energy according to:

$$K = e^{-\Delta G°/RT} \quad (4)$$

wherein a dependency on the temperature can be seen.

Accordingly, the constant K can be determined at different temperatures by means of any suitable software program (for example, by the so-called CSIRO Thermochemistry System Version V, developed by the CSIRO Division of Mineral Products, Australia). In Table 1, set forth after the last of the equations immediately below, calculations are shown for the equilibrium constant K within the temperature range in which reduction reactions occur.

The constant K for the equilibrium in (3) is rendered as the product of two concentration ratios, on the one hand a ratio corresponding to the solid phase, and on the other hand a ratio corresponding to the gaseous phase. Therefore, by grouping together the concentrations of the same phase, one would have:

$$K = \frac{[CO_2]}{[CO]} \cdot \frac{[Fe°]^n}{[Fe_nO]} \quad (5)$$

To relate equation 5 to the metallization achieved, the molar concentrations of $Fe°$ and $Fe_nO$ must be in mass percentage:

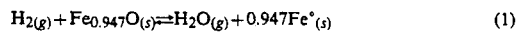

$$\frac{[Fe]^n}{[Fe_nO]} = \frac{\left[\frac{\% Fe}{M.W._{Fe}} / M.W._{DRI}\right]^n}{\frac{\% Fe_nO}{M.W._{Fe_nO}} / M.W._{DRI}} = 1.5266 \frac{\% Fe^n}{\% Fe_nO} \quad (6)$$

percentage of wustite as $Fe^{+2}$ can be expressed by:

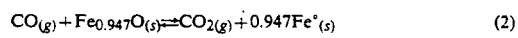

$$\% Fe_nO = \frac{(\% Fe^{+2})(M.W._{Fe_n}/M.W._{Fe})}{n} = 1.3025 (\% Fe^{+2}) \quad (7)$$

substituting (7) in (6):

$$\frac{[Fe]^n}{[Fe_nO]} = 1.1725 \frac{\% Fe^n}{\% Fe^{+2}} \quad (8)$$

which can be expressed by:

$$\frac{[Fe]^n}{[Fe_nO]} = 1.1725 \frac{(\% Fe)(\% Fe^{(n-1)})}{\% Fe^{+2}} \quad (9)$$

equation 9 can be simplified to:

$$\frac{[Fe]^n}{[Fe_nO]} = 0.9298 \frac{(\% Fe)}{\% Fe^{+2}} \quad (10)$$

substituting equation 10 in equation 5:

$$K = 0.9298 \frac{(\% Fe)}{\% Fe^{+2}} \quad (11)$$

As the metallization for an ore is a relation between metallic iron and total iron as mass percentages:

$$\% M_{tz} = 100 \frac{\% Fe}{\% Fe_{TOT}} = 100 \frac{\% Fe}{\% Fe + \% Fe^{+2}} \quad (12)$$

which can be modified to:

$$\% M_{tz} = \frac{100}{1 + \frac{\% Fe^{+2}}{\% Fe}} \quad (13)$$

substituting equation 11 in equation 13:

$$\% M_{tz} = \frac{100}{1 + 0.9298 \cdot \frac{[CO_2]}{[CO]} \cdot \frac{1}{K}} \quad (14)$$

TABLE 1

| T (°C.) | K | T (°C.) | K | T (°C.) | K |
|---|---|---|---|---|---|
| 600 | 0.9137 | 705 | 0.6800 | 810 | 0.5435 |
| 605 | 0.8993 | 710 | 0.6717 | 815 | 0.5386 |
| 610 | 0.8854 | 715 | 0.6636 | 820 | 0.5338 |

TABLE 1-continued

| T (°C.) | K | T (°C.) | K | T (°C.) | K |
|---|---|---|---|---|---|
| 615 | 0.8718 | 720 | 0.6557 | 825 | 0.5291 |
| 620 | 0.8585 | 725 | 0.6480 | 830 | 0.5245 |
| 625 | 0.8457 | 730 | 0.6405 | 835 | 0.5200 |
| 630 | 0.8331 | 735 | 0.6332 | 840 | 0.5156 |
| 635 | 0.8210 | 740 | 0.6260 | 845 | 0.5113 |
| 640 | 0.8091 | 745 | 0.6190 | 850 | 0.5071 |
| 645 | 0.7975 | 750 | 0.6122 | 855 | 0.5029 |
| 650 | 0.7863 | 755 | 0.6055 | 860 | 0.4988 |
| 655 | 0.7753 | 760 | 0.5990 | 865 | 0.4948 |
| 660 | 0.7647 | 765 | 0.5927 | 870 | 0.4909 |
| 665 | 0.7543 | *768.85 | 0.5879 | 875 | 0.4870 |
| 670 | 0.7441 | 770 | 0.5865 | 880 | 0.4832 |
| 675 | 0.7343 | 775 | 0.5807 | 885 | 0.4794 |
| 680 | 0.7246 | 780 | 0.5750 | 890 | 0.4758 |
| 685 | 0.7153 | 785 | 0.5694 | 895 | 0.4722 |
| 690 | 0.7061 | 790 | 0.5640 | 900 | 0.4686 |
| 695 | 0.6972 | 800 | 0.5535 | | |
| 700 | 0.6885 | 805 | 0.5484 | | |

*At this temperature a change in phase occurs for the Fe.

In experimental tests the composition of the reducing gas was measured in different levels within the reduction reactor and the $CO/CO_2$ ratio was calculated for each level as follows in TABLE 2:

TABLE 2

| SFR | STR | RATIO $CO/CO_2$ LEVEL INSIDE THE REACTOR | | | | | Final |
|---|---|---|---|---|---|---|---|
| Lbmol/TFe | °C. | 4 | 5 | 6 | 8 | 9 | % Met. |
| 152 | 905 | N.D. | N.D. | 1.94 | 0.64 | 0.88 | 82.1 |
| 152 | 915 | 9.55 | 3.95 | 2.02 | 0.98 | 0.91 | 83.3 |
| 165 | 905 | 13.46 | 5.30 | 3.21 | 1.08 | 0.95 | 87.2 |
| 165 | 915 | 6.72 | 4.88 | 5.09 | 1.13 | 0.93 | 90.7 |
| 165 | 915 | 14.56 | 5.49 | 5.39 | 1.24 | 0.93 | 90.7 |
| 178 | 915 | N.D. | N.D. | 7.23 | 1.71 | 0.97 | 93.5 |
| 178 | 915 | 11.32 | 12.20 | 8.19 | 1.73 | 1.02 | 95.9 |

*N.D. = No data.
SFR = Specific Flow to Reduction
STR = Specific Temperature to Reduction wherein level 9 is in the reducing gas outlet at the top portion of the reactor, level 8 is a lower level relative to level 9 and so on respectively.

As can be seen in Table 2, the $CO/CO_2$ ratio diminishes as the reducing gas rises through the burden. Because of such variation, with small ratio values in the upper levels of the burden, a large variation in the metallization (e.g. at levels 8 or 9) will result in only a very little change in the $CO/CO_2$ ratio. This latter feature makes the utilization of the $CO/CO_2$ ratio at these upper levels almost useless due to its lack of sensitivity. On the other hand, while the $CO/CO_2$ ratio is largest at level 4, there are large fluctuations (ups and downs) around levels 4 and 5 due to the uneven flow of the reducing gas adjacent such lower levels at the reducing gas inlet. Such fluctuating changes in the ratio render unreliable predicted metallizations at these lower levels. This is discussed more fully below. The final metallizations reached with respect to each line of ratios at the different levels are also shown in Table 2. As can be seen, the $CO/CO_2$ ratios for level 6 show stability and a linear tendency. Moreover, these level 6 ratios are large enough to give reasonable sensitivity and adequately reflect the changes in metallizations. Therefore, level 6 is the preferred sampling point for effectively correlating the $CO/CO_2$ ratios with the final metallization.

Figure 2:
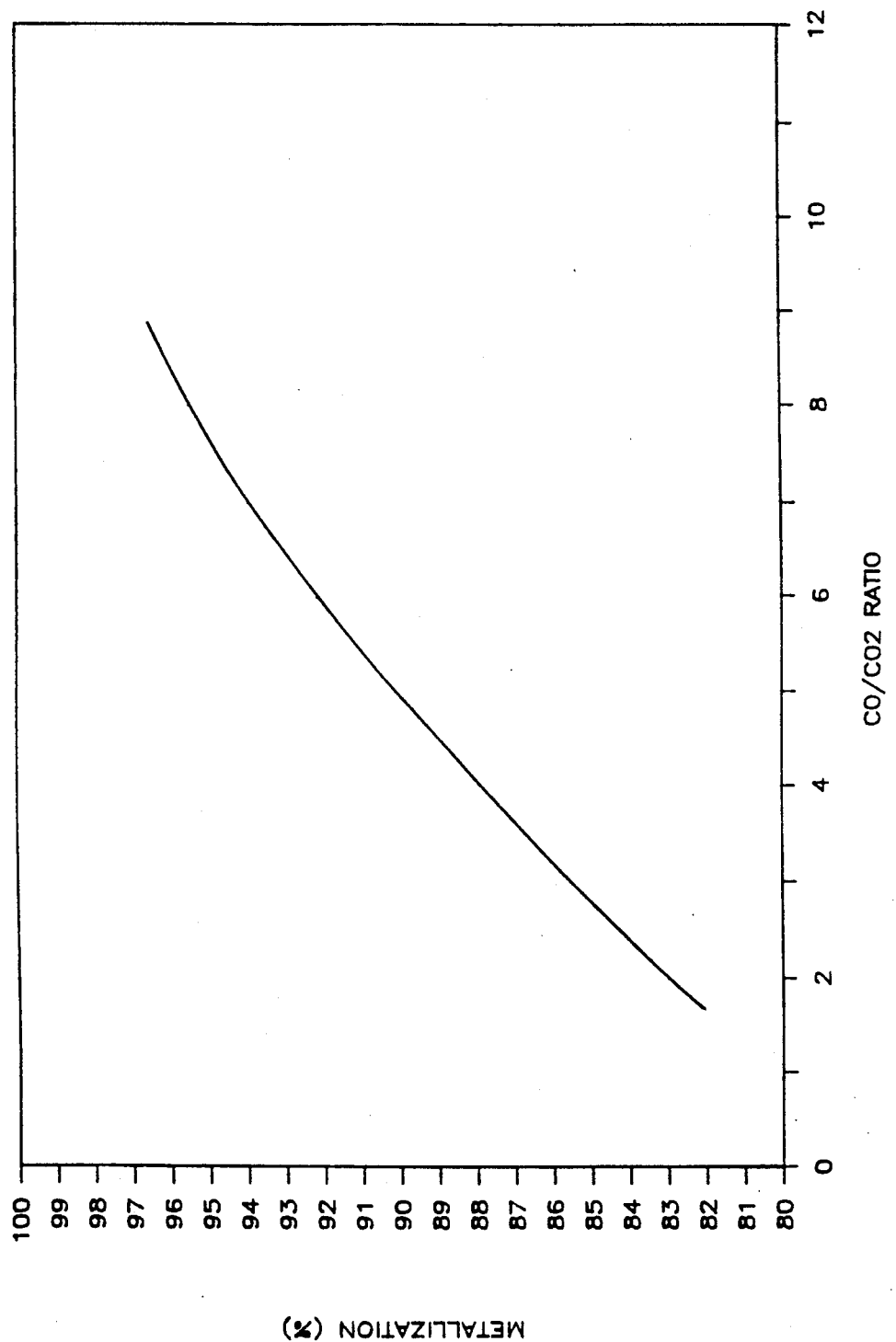
FIG. 2 is a graph showing the relation between percentage of metallization and the $CO/CO_2$ ratio.

In FIG. 1 the final metallization is plotted against the time of reduction and compared with respect to a corresponding plot of the $CO/CO_2$ ratio. From this double plot, it is clearly seen that the $CO/CO_2$ ratio closely follows the metallization level changes caused by changes in the operating parameters. As shown in FIG. 2, when the percentage of metallization is plotted against the $CO/CO_2$ ratio, a clear rising tendency very close to being a straight line results, which reflects a good correlation between the data.

Tests have shown and conformed that the mid-portion of the reduction zone in a vertical moving bed reduction reactor, represented in Table 2 as level 6 (and in FIG. 3 by alphanumeral L6), is in the best area for measuring the composition of the reducing gas. This is preferred, because the $CO/CO_2$ ratio is apparently not chemically affected there by the incoming fresh reducing gas, due to the fact that such mid-point is within a zone wherein a dynamic chemical stability has been achieved. It should be understood that such point must be calculated or found on a trial and error basis mainly based on the characteristics of the design of the reactor, the operational parameters, and the oxidic ores being treated. These combined can cause variation from case to case in where best to take measurements. It is desirable to optimize the location of the point of measurement, by performing sensitivity tests based on experimental design.

SPECIFIC EXAMPLE

Figure 3:
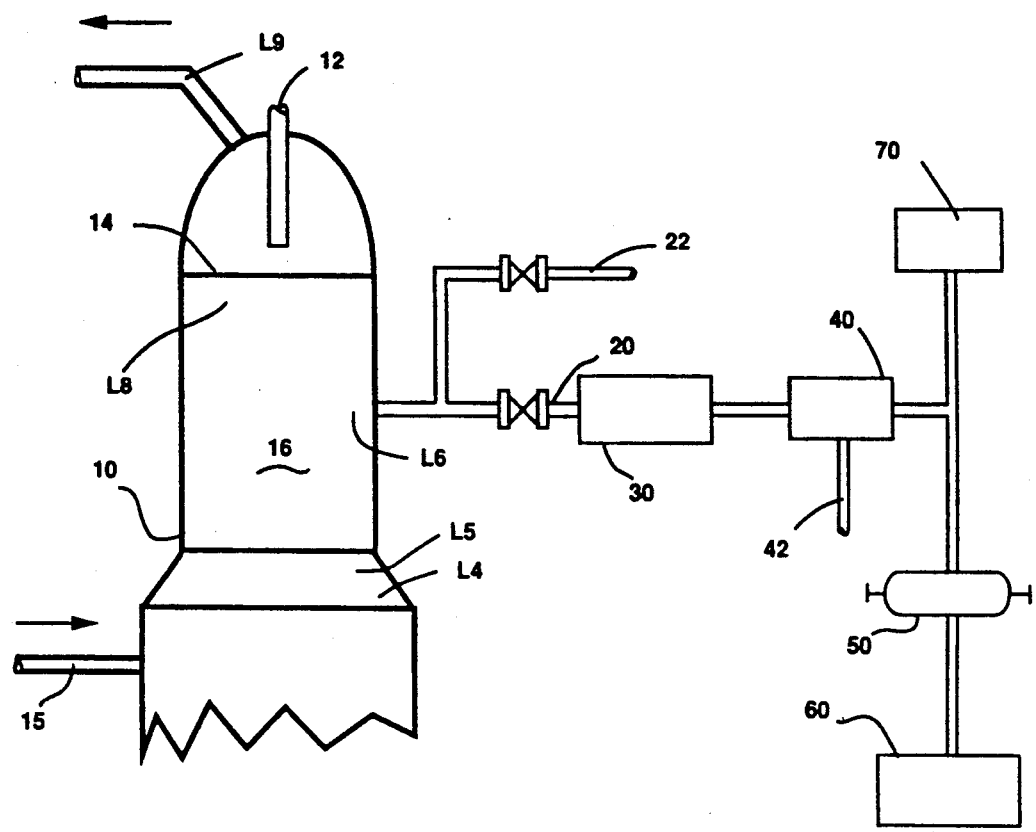
FIG. 3 is a schematic diagram of a section of a moving bed direct reduction reactor provided with probes for measurement and reducing gas analyzing equipment.

Tests were carried out on a moving bed direct reduction reactor pilot plant for producing sponge iron. Sampling points were prepared in the reduction reactor along the reduction zone as shown in FIG. 3. The sampling probes were located at the reduction gas inlet (level 4) as probe L4, immediately above the reduction gas inlet (level 5) as probe L5, near the mid-portion of the reduction zone of the reactor (level 6) as probe L6, near the beginning of the iron ore burden (level 8) as probe L8, and at the reduction gas outlet (level 9) as probe L9. The reducing gas was sampled every three hours during 5 consecutive days at level 6 of the reactor. The sampling apparatus used is shown schematically in FIG. 3, wherein sponge iron was produced by gaseous reduction of iron ore in a vertical moving bed direct reduction reactor 10 which comprised: charging said ore to said reactor at feed pipe 12; passing a reducing gas largely composed of $H_2$ and CO from an inlet 15 through said bed of ore 14 in a reducing zone 16 and out the take off pipe 18; discharging as sponge iron from the bottom (not shown) of the reactor 10 the ore reduced in said zone 16, wherein the reduction gas was sampled from the direct reduction reactor 10 at level 6 via a thermowell (serving as a probe hole) L6, passed via pipe 20 through cooling coil 30, filtered and dewatered in filter 40, and passed into bulbs 50 for manual analysis by means of chromatograph 60 to determine the CO and $CO_2$ content of the gas. The analysis could also alternatively be directly made by means of an automatic process chromatograph 70, which is usually connected to the reduction reactor. The metallization of the burden was determined in the laboratory by means of standard tests in the art and the data for the $CO/CO_2$ ratio and for the metallization are set forth in Table 3. See also FIG. 2 for a graphic presentation based on similar calculated data plotted against time.

Variations can be made manually or automatically to one or more of the main process variables to modify and achieve a given $CO/CO_2$ ratio known to correspond to the desired final metallization and thereby produce sponge iron with such desired metallization.

The experimental data can be found in Table 3:

TABLE 3

| STR (°C.) | SFR (lbmol/Hr) | TIME (Hours) | CO/CO$_2$ RATIO | REAL FINAL METALLIZATION (%) |
|---|---|---|---|---|
| 917 | 166.1 | 3 | 2.23 | 84.0 |
| 917 | 166.4 | 6 | 2.13 | 87.1 |
| 915 | 164.5 | 9 | 2.11 | 85.9 |
| 915 | 163.6 | 12 | 2.09 | 84.7 |
| 915 | 165.8 | 15 | 2.20 | 86.8 |
| 915 | 167.3 | 18 | 2.24 | 86.7 |
| 920 | 166.3 | 21 | 2.38 | 87.2 |
| 915 | 164.7 | 24 | 2.49 | 87.9 |
| 915 | 164.3 | 27 | 2.62 | 88.6 |
| 915 | 164.3 | 30 | 2.56 | 88.4 |
| 915 | 164.4 | 33 | 2.49 | 87.6 |
| 915 | 166.6 | 36 | 2.39 | 87.5 |
| 915 | 163.6 | 39 | 2.49 | 88.0 |
| 915 | 165.2 | 42 | 2.73 | 87.3 |
| 915 | 164.7 | 45 | 3.17 | 85.8 |
| 915 | 164.9 | 48 | 3.43 | 88.0 |
| 915 | 164.8 | 51 | 3.47 | 89.5 |
| 915 | 164.8 | 54 | 3.18 | 88.9 |
| 915 | 164.1 | 57 | 2.97 | 87.8 |
| 915 | 162.9 | 60 | 2.74 | 87.2 |
| 920 | 158.8 | 63 | 2.66 | 87.1 |
| 910 | 164.5 | 66 | 2.51 | 87.1 |
| 917 | 166.3 | 69 | 2.50 | 86.1 |
| 915 | 165.2 | 72 | 3.08 | 86.1 |
| 913 | 177.8 | 75 | 4.70 | 88.4 |
| 915 | 181.6 | 78 | 6.90 | 90.0 |
| 915 | 176.9 | 81 | 8.36 | 94.3 |
| 915 | 177.4 | 84 | 8.91 | 94.3 |
| 915 | 177.6 | 87 | 8.00 | 94.1 |
| 915 | 177.9 | 90 | 7.56 | 93.7 |
| 915 | 178.0 | 93 | 8.30 | 94.1 |
| 915 | 177.4 | 96 | 8.79 | 94.9 |
| 915 | 179.7 | 99 | 8.50 | 94.4 |
| 915 | 177.5 | 102 | 7.88 | 93.6 |
| 915 | 176.5 | 105 | 7.66 | 93.2 |
| 915 | 177.0 | 108 | 7.48 | 92.9 |
| 915 | 176.6 | 111 | 6.89 | 92.5 |

Pipe 22 will be recognized as a purge or further sampling point. Pipe 42 is merely a discharge pipe for extracted water and other residue from filter 40.

Figure 4:
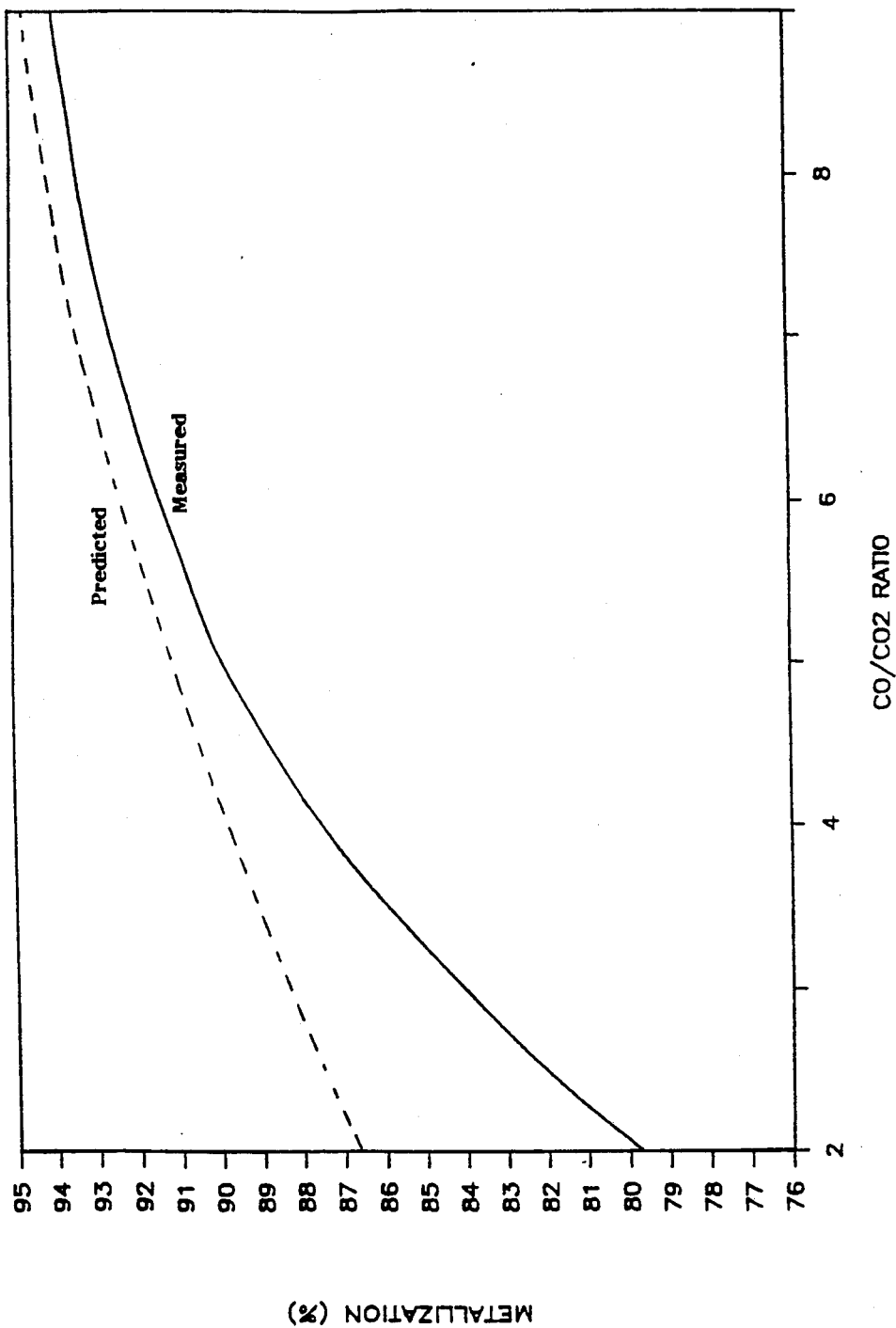
FIG. 4 is a graph showing a comparison between (a) the metallization predicted by formula (14) and (b) the metallization actually achieved as measured at the end of the process with both being plotted against $CO/CO_2$ ratios measured at level (6).

The above described tests and experimental data, confirmed that the CO/CO$_2$ ratio closely follows the tendency of the metallization. As can be seen in FIG. 4, a close correlation exists between the metallization predicted from CO/CO$_2$ ratio measurements taken at level 6 (i.e. at a mid-portion of the reduction zone of the reducing reactor), represented by a dashed line, and the metallization actually directly measured at the end of the reduction process, represented by a solid line. The use of FIG. 4 allows the skilled worker to achieve a desired final metallization by correlating such final metallization with the predicted metallization resulting from gas samples at the mid-portion of the reactor and determining a CO/CO$_2$ ratio to be used which corresponds to said mid-portion metallization. These measurements are typically taken under relatively steady state conditions, so that although temperature can be important, its measurement as a variable normally is not necessary.

It should be understood that a number of variations can be made to the preferred embodiments to best suit particular needs. It is possible to substitute the use of the CO/CO$_2$ ratio by a H$_2$/H$_2$O ratio which despite the need of special equipment to be determined accomplishes the same purposes. An automatically % metallization-CO/CO$_2$ correlator can also be added to the sampling apparatus to automatically control the process variables to produce a sponge iron with a desired preset metallization. Accordingly, the reduction process can be fully automated to vary and control flows, temperatures, CO$_2$ content in the reducing gas and ore flow rates by means of the method herein described.

We claim:

1. A method for producing sponge metal of a given metallization by gaseous reduction of oxidic metal ore in a vertical moving bed direct reduction reactor comprising passing a reducing gas substantially composed of H$_2$ and CO through said bed of ore in a reducing zone;

taking a sample of the reducing gas from a stabilized point of measure within the reducing zone of the reactor;

determining the concentration ratio of a reducing gas species and its oxidized product in said sample;

comparing said determined concentration ratio with an empirically established interrelationship between such concentration ratios and corresponding degrees of metallization of the ore upon discharge; and regulating process control parameters to modify the concentration ratio at the point of measure to a ratio previously established to yield the given metallization for the sponge metal.

2. A method for producing sponge iron of a given metallization by gaseous reduction of iron ore in a vertical moving bed direct reduction reactor comprising the steps of:

charging said ore to said reactor;

passing a reducing gas largely composed of H$_2$ and CO through said bed of ore in a reducing zone;

discharging sponge iron from the reducing zone;

determining with regard to partially reduced iron ore proximate to a level in said reducing zone the extent of final reduction such proximate ore will have upon discharge if current reducing conditions are maintained, by the steps of:

(1) locating and establishing a stabilized point of measure within the reducing zone of the reactor;

(2) taking a sample of the reducing gas at said point;

(3) measuring the sample and determining the concentration ratio of CO/CO$_2$ in said sample;

(4) calculating from said concentration ratio a % metallization of the iron ore;

(5) obtaining from said calculation a value indicative of the extent of metallization of the iron ore upon discharge; and said calculation being in accordance with the following relationship:

$$\% \, Mtz = \frac{100}{1 + 0.9298 \frac{[CO_2]}{[CO]} \cdot \frac{1}{K}}$$

with K selected from the following table (or its substantial equivalent):

| T (°C.) | K | T (°C.) | K | T (°C.) | K |
|---|---|---|---|---|---|
| 600 | 0.9137 | 705 | 0.6800 | 810 | 0.5435 |
| 605 | 0.8993 | 710 | 0.6717 | 815 | 0.5386 |
| 610 | 0.8854 | 715 | 0.6636 | 820 | 0.5338 |
| 615 | 0.8718 | 720 | 0.6557 | 825 | 0.5291 |
| 620 | 0.8585 | 725 | 0.6480 | 830 | 0.5245 |
| 625 | 0.8457 | 730 | 0.6405 | 835 | 0.5200 |
| 630 | 0.8331 | 735 | 0.6332 | 840 | 0.5156 |
| 635 | 0.8210 | 740 | 0.6260 | 845 | 0.5113 |
| 640 | 0.8091 | 745 | 0.6190 | 850 | 0.5071 |
| 645 | 0.7975 | 750 | 0.6122 | 855 | 0.5029 |
| 650 | 0.7863 | 755 | 0.6055 | 860 | 0.4988 |

-continued

| T (°C.) | K | T (°C.) | K | T (°C.) | K |
|---|---|---|---|---|---|
| 655 | 0.7753 | 760 | 0.5990 | 865 | 0.4948 |
| 660 | 0.7647 | 765 | 0.5927 | 870 | 0.4909 |
| 665 | 0.7543 | *768.85 | 0.5879 | 875 | 0.4870 |
| 670 | 0.7441 | 770 | 0.5865 | 880 | 0.4832 |
| 675 | 0.7343 | 775 | 0.5807 | 885 | 0.4794 |
| 680 | 0.7246 | 780 | 0.5750 | 890 | 0.4758 |
| 685 | 0.7153 | 785 | 0.5694 | 895 | 0.4722 |
| 690 | 0.7061 | 790 | 0.5640 | 900 | 0.4686 |
| 695 | 0.6972 | 800 | 0.5535 | | |
| 700 | 0.6885 | 805 | 0.5484 | | |

3. A method according to claim 1, wherein said reducing gas species is carbon monoxide and said concentration ratio is $CO/CO_2$.

4. A method according to claim 1, wherein said reducing gas species is hydrogen and said concentration ratio is $H_2/H_2O$.

5. A method according to claim 2, comprising the further step of:
   (6) regulating process control parameters to modify the $CO/CO_2$ ratio to that ratio known to give the desired value for the percentage of reduction of the discharged sponge iron.

6. A method according to claim 3, wherein said ore is iron ore and said sponge metal is sponge iron.

7. A method according to claim 4, wherein said ore is iron ore and said sponge metal is sponge iron.

8. A method according to claim 6, further comprising generating a signal indicative of the extent of metallization.

9. A method according to claim 6, wherein the spent reducing gas from said reducing zone is dewatered, stripped of $CO_2$, and recycled with reducing gas make up to said reducing zone.

10. A method according to claim 5, wherein the spent reducing gas from said reducing zone is dewatered, stripped of $CO_2$, and recycled with reducing gas make up to said reducing zone.

11. A method according to claim 6, wherein said point of measure is within the middle half of said reducing zone.

12. A method according to claim 7, wherein said point of measure is within the middle half of said reducing zone.

13. A method according to claim 10, wherein said point of measure is within the middle half of said reducing zone.

14. A method according to any one of claims 1, 5, 6, 9, and 10, wherein the process parameters regulated to modify the $CO/CO_2$ ratio are at least one of reducing gas temperature, ore flow rate, reducing gas flow rate, and $CO_2$ content of the reducing gas.

* * * * *